(12) United States Patent
Mori

(10) Patent No.: US 11,393,502 B2
(45) Date of Patent: Jul. 19, 2022

(54) MAGNETIC RECORDING MEDIUM HAVING NON-MAGNETIC LAYER AND CHARACTERIZED VERTICAL SQUARENESS RATIO, AND MAGNETIC RECORDING AND REPRODUCING DEVICE

(71) Applicant: FUJIFILM Corporation, Tokyo (JP)

(72) Inventor: Masahiko Mori, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 177 days.

(21) Appl. No.: 16/809,986

(22) Filed: Mar. 5, 2020

(65) Prior Publication Data
US 2020/0286515 A1    Sep. 10, 2020

(30) Foreign Application Priority Data
Mar. 6, 2019    (JP) .............................. JP2019-040968

(51) Int. Cl.
*G11B 5/733*    (2006.01)
*G11B 5/735*    (2006.01)
*G11B 5/70*    (2006.01)

(52) U.S. Cl.
CPC ............... *G11B 5/733* (2013.01); *G11B 5/70* (2013.01); *G11B 5/7334* (2019.05); *G11B 5/7356* (2019.05)

(58) Field of Classification Search
None
See application file for complete search history.

(56) References Cited

U.S. PATENT DOCUMENTS

| | | | | |
|---|---|---|---|---|
| 5,645,917 A * | 7/1997 | Ejiri | ....................... | G11B 5/733 428/141 |
| 6,479,131 B1 * | 11/2002 | Ejiri | ....................... | G11B 5/733 428/141 |
| 8,535,817 B2 * | 9/2013 | Imaoka | .................... | G11B 5/70 428/844 |
| 2001/0044037 A1 * | 11/2001 | Naoe | ..................... | G11B 5/714 428/843.1 |
| 2003/0148128 A1 * | 8/2003 | Tomaru | .................. | G11B 5/733 428/480 |
| 2004/0131892 A1 * | 7/2004 | Sueki | ...................... | G11B 5/70 428/842 |
| 2005/0142386 A1 * | 6/2005 | Inoue | ...................... | G11B 5/70 428/840.5 |
| 2006/0187589 A1 | 8/2006 | Harasawa et al. | | |
| 2007/0224456 A1 | 9/2007 | Murao et al. | | |
| 2016/0005430 A1 * | 1/2016 | Kawakami | ......... | G11B 5/70678 428/840.1 |
| 2018/0240478 A1 * | 8/2018 | Kasada | .................... | G11B 5/02 |
| 2018/0286450 A1 | 10/2018 | Kasada et al. | | |
| 2019/0074032 A1 * | 3/2019 | Mori | ........................ | G11B 5/70 |

FOREIGN PATENT DOCUMENTS

| | | |
|---|---|---|
| JP | 2006-236399 A | 9/2006 |
| JP | 2006-286074 A | 10/2006 |
| JP | 2007-265477 A | 10/2007 |
| JP | 2018-170060 A | 11/2018 |

OTHER PUBLICATIONS

Notice of Reasons for Refusal dated Dec. 7, 2021 from the Japanese Patent Office in Japanese Application No. 2019-040968.

* cited by examiner

*Primary Examiner* — Kevin M Bernatz
(74) *Attorney, Agent, or Firm* — Sughrue Mion, PLLC

(57) ABSTRACT

The magnetic recording medium includes: a non-magnetic support; and a non-magnetic layer including a non-magnetic powder and a magnetic layer including a ferromagnetic powder on the non-magnetic support in this order, in which a vertical squareness ratio is 0.70 to 1.00, a center line average roughness Ra measured regarding a surface of the magnetic layer with an atomic force microscope is equal to or smaller than 2.5 nm, and an interface variation rate between the magnetic layer and the non-magnetic layer in a cross section image obtained by imaging with a scanning electron microscope is equal to or less than 2.5%.

20 Claims, No Drawings

MAGNETIC RECORDING MEDIUM HAVING NON-MAGNETIC LAYER AND CHARACTERIZED VERTICAL SQUARENESS RATIO, AND MAGNETIC RECORDING AND REPRODUCING DEVICE

CROSS-REFERENCE TO RELATED APPLICATIONS

This application claims priority under 35 U.S.C 119 to Japanese Patent Application No. 2019-040968 filed on Mar. 6, 2019. The above application is hereby expressly incorporated by reference, in its entirety, into the present application.

BACKGROUND OF THE INVENTION

1. Field of the Invention

The present invention relates to a magnetic recording medium and a magnetic recording and reproducing device.

2. Description of the Related Art

As a magnetic recording medium, a magnetic recording medium having a configuration including a non-magnetic layer and a magnetic layer on a non-magnetic support in this order has been known (for example, see JP2006-286074A).

SUMMARY OF THE INVENTION

In a magnetic recording medium, it is constantly desired to further improve electromagnetic conversion characteristics. Here, an object of the invention is to provide a magnetic recording medium including a non-magnetic layer and a magnetic layer on a non-magnetic support in this order and capable of exhibiting excellent electromagnetic conversion characteristics.

According to one aspect of the invention, there is provided a magnetic recording medium comprising: a non-magnetic support; and a non-magnetic layer including a non-magnetic powder and a magnetic layer including a ferromagnetic powder on the non-magnetic support in this order, in which a vertical squareness ratio is 0.70 to 1.00, a center line average roughness Ra measured regarding a surface of the magnetic layer with an atomic force microscope (hereinafter, also referred to as a "magnetic layer surface Ra") is equal to or smaller than 2.5 nm, and an interface variation rate between the magnetic layer and the non-magnetic layer (hereinafter, also simply referred to as an "interface variation rate") in a cross section image obtained by imaging with a scanning electron microscope is equal to or less than 2.5%.

In an aspect, a void volume of the non-magnetic layer in the cross section image obtained by imaging with a scanning electron microscope may be equal to or less than 10.0%.

In an aspect, the non-magnetic powder of the non-magnetic layer may include carbon black.

In an aspect, a specific surface area of the carbon black included in the non-magnetic layer may be 280 to 500 m²/g.

In an aspect, the non-magnetic layer may include 30.0% by mass or more of the carbon black with respect to a total amount of the non-magnetic powder.

In an aspect, a thickness of the non-magnetic layer may be equal to or less than 1.00 μm.

In an aspect, the magnetic layer may include a non-magnetic powder.

In an aspect, the non-magnetic powder of the magnetic layer may include colloidal particles.

In an aspect, the colloidal particles may be silica colloidal particles.

In an aspect, the magnetic recording medium may further comprise: a back coating layer including a non-magnetic powder on a surface of the non-magnetic support opposite to a surface provided with the non-magnetic layer and the magnetic layer.

According to another aspect of the invention, there is provided a magnetic recording and reproducing device comprising: the magnetic recording medium; and a magnetic head.

According to an aspect of the invention, it is possible to provide a magnetic recording medium including a non-magnetic layer and a magnetic layer on a non-magnetic support in this order, and capable of exhibiting excellent electromagnetic conversion characteristics. In addition, according to another aspect of the invention, it is possible to provide a magnetic recording and reproducing device including the magnetic recording medium.

DESCRIPTION OF THE PREFERRED EMBODIMENTS

[Magnetic Recording Medium]

One aspect of the invention relates to a magnetic recording medium including: a non-magnetic support; and a non-magnetic layer including a non-magnetic powder and a magnetic layer including a ferromagnetic powder on the non-magnetic support in this order, in which a vertical squareness ratio is 0.70 to 1.00, a center line average roughness Ra measured regarding a surface of the magnetic layer with an atomic force microscope is equal to or smaller than 2.5 nm, and an interface variation rate between the magnetic layer and the non-magnetic layer in a cross section image obtained by imaging with a scanning electron microscope is equal to or less than 2.5%.

Hereinafter, methods for obtaining various numerical values will be described.

In the invention and the specification, the "vertical squareness ratio" is a squareness ratio measured regarding a magnetic recording medium in a vertical direction. The "vertical direction" described regarding the squareness ratio is a direction orthogonal to the surface of the magnetic layer. In the invention, the "surface of the magnetic layer" is identical to the surface of the magnetic recording medium on the magnetic layer side. The vertical squareness ratio of the invention and the specification is a value obtained by sweeping an external magnetic field in the magnetic recording medium at a measurement temperature of 23° C.±1° C. in the vibrating sample magnetometer, under conditions of a maximum external magnetic field of 15 kOe (1 [kOe]=10⁶/ 4π [A/m]) and a scan speed of 60 Oe/sec, and is a value after diamagnetic field correction. The measurement value is obtained as a value obtained by subtracting magnetization of a sample probe of the vibrating sample magnetometer as background noise.

In the invention and the specification, the center line average roughness Ra is obtained by the measurement using an atomic force microscope (AFM). Specifically, it is a value measured in a region having an area of 40 μm×40 μm of the surface of the magnetic layer. The measurement is performed in three different measurement portions of the surface of the magnetic layer (n=3). The center line average roughness Ra is obtained as an arithmetical mean of the three values obtained by the measurement descried above.

As an example of the measurement conditions, the following measurement conditions can be used. The center line average roughness Ra shown in examples which will be described later is a value obtained by the measurement under the following measurement conditions.

The measurement is performed regarding the region of 40 µm×40 µm of the area of the surface of the magnetic layer of the magnetic recording medium with an AFM (Nanoscope 4 manufactured by Veeco Instruments, Inc.) in a tapping mode. RTESP-300 manufactured by BRUKER is used as a probe, a resolution is set as 512 pixel×512 pixel, and a scan speed is a speed measured regarding 1 screen (512 pixel×512 pixel) at 341 seconds.

In the invention and the specification, an interface variation rate between the magnetic layer and the non-magnetic layer and a void volume of the non-magnetic layer are values obtained regarding the cross section image obtained using a scanning electron microscope (SEM). Methods for obtaining the interface variation rate and the void volume will be described below.

(1) Manufacturing of Sample for Cross Section Observation

A sample for cross section observation is cut and manufactured from a random predetermined position of the magnetic recording medium which is a measurement target. The manufacturing of the sample for cross section observation is performed by focused ion beam (FIB) processing using a gallium ion ($Ga^+$) beam.

A specific example of such a manufacturing method will be described in the examples.

(2) Specifying of Non-Magnetic Layer

The manufactured sample for cross section observation is observed with the SEM and a cross section image (SEM image) is captured. As a scanning electron microscope, a field emission scanning electron microscope (FE-SEM) is used. For example, FE-SEM 54800 manufactured by Hitachi, Ltd. can be used, and in the examples which will be described later, this FE-SEM was used.

In the same sample for cross section observation, SEM images are captured at randomly selected positions except that i) captured ranges are not overlapped, ii) the outermost surface on the magnetic layer side (surface of magnetic layer) is settled in the SEM image, iii) the entire region of the sample for cross section observation in thickness direction (that is, region from the outermost surface on the magnetic layer side to the outermost surface on the other side) is settled in the SEM image, or in a case where the entire region of the sample for cross section observation in thickness direction is not settled in the SEM image, a percentage of an imaged portion of the sample for cross section observation occupying the total area of the image of the SEM image is 80% to 100%, and four images are obtained in total.

The SEM image is a secondary electron (SE) image captured at an acceleration voltage of 5 kV, an imaging magnification of 100,000, and at 960 pixel×1280 pixel.

The captured SEM image is set in WinROOF manufactured by Mitani Corporation which is image processing software, and a portion (measurement region) of the non-magnetic layer in the SEM image is selected. In the selection of the measurement region, a length of the measurement region in a width direction is the entire width of the captured SEM image. A "width direction" described regarding the SEM image is a width direction of the captured sample for cross section observation. The width direction of the sample for cross section observation is a width direction of the magnetic recording medium, from which this sample is cut out. The same also applies to a thickness direction.

An interface between the magnetic layer and the non-magnetic layer in the thickness direction is specified by the following method. The SEM image is digitized to obtain image brightness data in the thickness direction (formed of three components of a coordinate in thickness direction, a coordinate in width direction, and brightness). In the digitization, the SEM image is divided into 1280 parts in the width direction processed with brightness of 8 bits to obtain data having 256 gradations, the image bright of each divided coordinate point is transformed into a predetermined gradation value. Next, in the obtained image brightness data, a brightness curve is drawn by setting an average value of brightness in the width direction of each coordinate point in the thickness direction (that is, average value of brightness at each 1280-divided coordinate point) as a vertical axis, the coordinate in the thickness direction as a horizontal axis. The drawn brightness curve is differentiated to draw a differential curve, and a coordinate of an interface between the magnetic layer and the non-magnetic layer is specified from a peak position of the drawn differential curve. The position corresponding to the specific coordinate on the SEM image is set as the interface between the magnetic layer and the non-magnetic layer. In a case where a portion of the non-magnetic support is included in the SEM image, the interface between the non-magnetic layer and the non-magnetic support is specified. For example, in the coating type magnetic recording medium, the interface between the non-magnetic layer and the non-magnetic support can be clearly recognized, compared to the interface between the magnetic layer and the non-magnetic layer. Accordingly, the interface between the non-magnetic layer and the non-magnetic support can be specified by visually observing the SEM image. However, the specification may be performed using the brightness curve, in the same manner as described above. In a case where the portion of the non-magnetic support is not included in the SEM image, the entire region of the portion of the non-magnetic layer in the thickness direction from the specified interface between the magnetic layer and the non-magnetic layer (that is, surface of the non-magnetic layer) is specified as the non-magnetic layer. On the other hand, in a case where the portion of the non-magnetic support is included in the SEM image, the entire region from the specified interface between the magnetic layer and the non-magnetic layer (that is, surface of the non-magnetic layer on the magnetic layer side) to the interface between the non-magnetic layer and the non-magnetic support (that is, surface of the non-magnetic layer on the non-magnetic support side) is specified as the non-magnetic layer.

(3) Specification of Void of Non-Magnetic Layer and Calculation of Void Volume

A sharpening process which is a function of WinROOF manufactured by Mitani Corporation which is image processing software is performed with respect to the measurement region that is specified as the non-magnetic layer in the section (2), and noise removing (4 pixel/1280 pixel) process is performed to emphasis an outline of a void existing in the measurement region. The outline of the void existing in the measurement region is selected by hand, and the outline and a portion surrounding the outline are binarized by the image processing software. In this case, a portion having a binarization area less than 25 $nm^2$ is not considered as a void, considered as noise, and excluded from the selection, and the portion having a binarization area equal to or greater than 25 $nm^2$ is specified as a void. Then, the areas of the portions specified as voids are added up to obtain a total area of the voids. A void volume is obtained from the following equation. Regarding four images, each void volume is obtained, and an arithmetical mean thereof is set as a void volume of the non-magnetic layer. In the equation, the units of the total area of the voids and the area of the measurement region may be $nm^2$, $\mu m^2$, or other units, as long as they are the same unit.

Void volume (%)=(total area of voids/area of measurement region)×100

Among the voids existing in the measurement region, there may be a void, a part of which is in the measurement region and the other part of which is not in the measurement region. Regarding such a void, the area of the portion of this void in the measurement region is used in a case of calculating the total area of the voids in a case of obtaining the void volume described above, and the area of the portion beyond the measurement region is not included in a case of calculating the total area.

(4) Calculation of Interface Variation Rate Between Magnetic Layer and Non-Magnetic Layer The interface variation rate between the magnetic layer and the non-magnetic layer is obtained by the following equation.

The sample for cross section observation manufactured by the method described in the section (1) is observed with the SEM and a cross section image (SEM image) is captured. As a scanning electron microscope, a field emission scanning electron microscope (FE-SEM) is used. For example, FE-SEM S4800 manufactured by Hitachi, Ltd. can be used, and in the examples which will be described later, this FE-SEM was used.

The SEM image is captured so that, in 10 portions of the manufactured sample for cross section observation which are randomly selected, the entire region of the non-magnetic layer in the thickness direction, at least a part of the magnetic layer, and at least a part of the non-magnetic support are settled in the SEM image. By doing so, 10 SEM images in total are obtained.

Each SEM image is a secondary electron image (SE image) captured at an acceleration voltage of 5 kV, an imaging magnification of 200,000, and at 960 pixel×1280 pixel. The interface between the magnetic layer and the non-magnetic layer and the interface between the non-magnetic layer and the non-magnetic support are specified by the method described in the section (2). In examples which will be described later, the interface between the non-magnetic layer and the non-magnetic support was visually specified.

In one random position on each SEM image, an interval between both interfaces in the thickness directions specified by the method described above is obtained, and an arithmetical mean of values obtained regarding the 10 images is set as the thickness of the non-magnetic layer. Thicknesses of other layers such as the magnetic layer and the non-magnetic support can be obtained by the same method. In addition, the thickness of the other layer may be obtained as a designed thickness calculated under manufacturing conditions. A variation rate of the thickness of the non-magnetic layer calculated by the following equation is set as the interface variation rate between the magnetic layer and the non-magnetic layer in the invention and the specification.

Interface variation rate (%)=(σ/T)×100

σ: standard deviation of thickness of non-magnetic layer obtained regarding the 10 images T: thickness of the non-magnetic layer obtained by the method described above (that is, arithmetical mean)

By setting the vertical squareness ratio, the magnetic layer surface Ra, and the interface variation rate between the magnetic layer and the non-magnetic layer to be in the ranges described above, the magnetic recording medium can exhibit excellent electromagnetic conversion characteristics. In addition, according to the magnetic recording medium, in an aspect, it is possible to prevent a deterioration in electromagnetic conversion characteristics after repeated running.

Hereinafter, the magnetic recording medium will be described more specifically.

Vertical Squareness Ratio

The vertical squareness ratio of the magnetic recording medium is equal to or greater than 0.70, and is preferably equal to or greater than 0.73, more preferably equal to or greater than 0.76, and even more preferably equal to or greater than 0.78, from a viewpoint of further improving electromagnetic conversion characteristics. In addition, the squareness ratio is 1.00 at most, in principle. The value of the vertical squareness ratio is preferably great, from a viewpoint of improving electromagnetic conversion characteristics. The vertical squareness ratio of the magnetic recording medium is equal to or smaller than 1.00, and can be, for example, equal to or smaller than 0.98, equal to or smaller than 0.96, equal to or smaller than 0.94, equal to or smaller than 0.92, equal to or smaller than 0.90, equal to or smaller than 0.88, or equal to or smaller than 0.86.

The vertical squareness ratio can be controlled by adjusting an alignment state of the ferromagnetic powder in the magnetic layer by a homeotropic alignment process or the like. In regards to this point, it is considered that it is also preferable to increase smoothness of the surface of the non-magnetic layer for decreasing the interface variation rate between the magnetic layer and the non-magnetic layer, in order to increase the value of the vertical squareness ratio. This is because that it is thought that it is possible to prevent a disorder of the alignment state of the ferromagnetic powder by roughness of a base (that is, surface of non-magnetic layer), by applying a magnetic layer forming composition including the ferromagnetic powder to a surface of the non-magnetic layer having high smoothness.

Magnetic Layer Surface Ra

The magnetic layer surface Ra of the magnetic recording medium is equal to or smaller than 2.5 nm, and is preferably equal to or smaller than 2.3 nm and more preferably equal to or smaller than 2.0 nm, from a viewpoint of further improving electromagnetic conversion characteristics. In addition, the magnetic layer surface Ra is preferably, for example, equal to or greater than 0.5 nm, equal to or greater than 1.0 nm, or equal to or greater than 1.3 nm, from a viewpoint of maintaining running stability. However, from a viewpoint of improving electromagnetic conversion characteristics, the value of the magnetic layer surface Ra is preferably small, and accordingly, the value can also be smaller than the range described above.

The magnetic layer surface Ra can be, for example, controlled by sizes of various powders such as the ferromagnetic powder included in the magnetic layer, a dispersion state of the magnetic layer forming composition, a thickness of the magnetic layer, and the manufacturing condition of the magnetic recording medium (for example, calendar process condition).

Interface Variation Rate between Magnetic Layer and Non-Magnetic Layer

In the magnetic recording medium, the interface variation rate between the magnetic layer and the non-magnetic layer is equal to or less than 2.5%. In JP2006-286074A, the interface variation rate between the magnetic layer and the non-magnetic layer is preferably greater (see claim 3 in JP2006-286074A). In the intensive studies of the inventors regarding this point, the studies were continued, after finding that, in the magnetic recording medium including the non-magnetic layer and the magnetic layer on the non-magnetic support, the interface variation rate between the magnetic layer and the non-magnetic layer also affects electromagnetic conversion characteristics, in addition to the vertical squareness ratio and the magnetic layer surface Ra. As a result, it was determined that the interface variation rate between the magnetic layer and the non-magnetic layer equal to or less than 2.5% contributes to the improvement of electromagnetic conversion characteristics. From a viewpoint of further improving electromagnetic conversion characteristics, the interface variation rate is preferably equal to or less than 2.3%, more preferably equal to or less than 2.0%, and even more preferably equal to or less than 1.8%. The interface variation rate can be, for example, equal to or more than 0.1%, equal to or more than 0.3%, equal to or more than 0.5%, or equal to or more than 0.7%. However, from a viewpoint of improving electromagnetic conversion characteristics, the value of the interface variation rate is preferably small, and accordingly, the value can also be less than the range described above and may be, for example, 0%. In addition, as described above, it is also preferable to increase smoothness of the surface of the non-magnetic layer for decreasing the interface variation rate between the magnetic layer and the non-magnetic layer, in order to increase the value of the vertical squareness ratio. In addition, it is considered that it is also preferable that the interface variation rate between the magnetic layer and the non-magnetic layer is equal to or less than 2.5%, in order to prevent a deterioration in electromagnetic conversion characteristics after repeated running. Hereinafter, this point will be further described.

For example, it is considered that a reason for a deterioration in electromagnetic conversion characteristics after repeated running is that a spacing between the surface of the magnetic layer and a magnetic head is widened, due to chipping of the surface of the magnetic layer or a contact of scraps into the magnetic head. In regards to this point, by forming a suitable projection on the surface of the magnetic layer by including a non-magnetic powder in the magnetic layer, it is possible to decrease a coefficient of friction between the surface of the magnetic layer and the magnetic head and to prevent chipping of the surface of the magnetic layer due to a contact with the magnetic head. However, in a case where the shape of the interface between the magnetic layer and the non-magnetic layer greatly varies depending on the position (that is, the interface variation rate is great), a depth of the projection of the surface of the magnetic layer pushed into the magnetic layer due to a contact with the magnetic head greatly varies depending on the position, and accordingly, a pressure applied to the projection from the magnetic head during the contact with the magnetic head greatly varies for each projection. As a result, it is thought that the projection received a stronger pressure is chipped or remained to be mounted, and accordingly, it is difficult for the projection to exist on the surface of the magnetic layer at a height capable of contributing to a decrease in coefficient of friction. On the other hand, it is thought that the interface variation rate between the magnetic layer and the non-magnetic layer equal to or less than 2.5% contributes to a decrease of a difference in depth of each projection pushed into the magnetic layer, during the contact with the magnetic head with respect to the repeated running. The inventors have surmised that this causes the prevention of a deterioration of electromagnetic conversion characteristics after the repeated running. However, this is merely a surmise, and the invention is not limited to such a surmise. The preferred range of the interface variation rate between the magnetic layer and the non-magnetic layer, from a viewpoint of preventing a deterioration of electromagnetic conversion characteristics after the repeated running is the same as described above.

The interface variation rate between the magnetic layer and the non-magnetic layer can be controlled, for example, by the thickness of the non-magnetic layer, a formation method of the non-magnetic layer, and the like. This point will be described later in detail.

<—Void Volume of Non-Magnetic Layer

Regarding the voids existing in the non-magnetic layer, it is thought that, as the number or voids is small, the non-magnetic layer tends to be hardly deformed. It is thought that the deformation of the non-magnetic layer causes a fluctuation of the depth of the projection on the surface of the magnetic layer described above to be pushed, and accordingly, it is surmised that the small number of the voids in the non-magnetic layer contributes to the further prevention of a deterioration of electromagnetic conversion characteristics after the repeated running. In addition, it is thought that, in the magnetic recording medium including the non-magnetic layer having a great number of voids, the particles of the non-magnetic powder existing close to the interface between the magnetic layer and the non-magnetic layer are fit into the voids, in a case of being pushed to the non-magnetic layer side due to a pressure applied to the surface of the magnetic layer during a contact with the magnetic head, and the particles are hardly returned to the original state, even after the contact with the magnetic head. It is thought that such a phenomenon also reduces the number of projections existing on the surface of the magnetic layer at a height capable of contributing to a decrease in coefficient of friction.

Thus, it is surmised that a small number of voids in the non-magnetic layer also contributes to the further prevention of a deterioration of electromagnetic conversion characteristics after the repeated running, from this viewpoint. In addition, it is thought that, in a case of performing a calendar process, for example, the alignment state of the ferromagnetic powder existing close to the interface with the non-magnetic layer may be greatly disordered, in a case where the non-magnetic layer is greatly deformed due to the pressure applied in the calendar process. In contrast, it is surmised that the small number of voids in the non-magnetic layer causes the alignment state of the ferromagnetic powder in the magnetic layer to be easily realized, and contributes to an increase in value of the vertical squareness ratio.

From the viewpoint described above, the void volume of the non-magnetic layer of the magnetic recording medium is preferably equal to or less than 10.0%, more preferably equal to or less than 9.0%, even more preferably equal to or less than 8.0%, still preferably equal to or less than 7.0%, still more preferably equal to or less than 6.0%, and still even more preferably equal to or less than 5.0%. In addition, the void volume of the non-magnetic layer is preferably equal to or more than 0.8%, more preferably equal to or more than 1.0%, even more preferably equal to or more than 1.2%, still preferably equal to or more than 1.5%, and still more preferably equal to or more than 2.0%, from a viewpoint of formability in the calendar process, for example.

Magnetic Layer

Ferromagnetic Powder

As the ferromagnetic powder included in the magnetic layer, a well-known ferromagnetic powder can be used, as the ferromagnetic powder used in the magnetic layer of various magnetic recording media. It is preferable to use ferromagnetic powder having a small average particle size, from a viewpoint of improvement of recording density. From this viewpoint, an average particle size of the ferromagnetic powder is preferably equal to or smaller than 50 nm, more preferably equal to or smaller than 45 nm, even more preferably equal to or smaller than 40 nm, still preferably equal to or smaller than 35 nm, still more preferably equal to or smaller than 30 nm, still even more preferably equal to or smaller than 25 nm, and still further more preferably equal to or smaller than 20 nm. Meanwhile, from a viewpoint of stability of magnetization, the average particle size of the ferromagnetic powder is preferably equal to or greater than 5 nm, more preferably equal to or greater than 8 nm, even more preferably equal to or greater than 10 nm, still preferably equal to or greater than 15 nm, still more preferably equal to or greater than 20 nm.

Hexagonal Ferrite Powder

As a preferred specific example of the ferromagnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

The invention and the specification, the "hexagonal ferrite powder" is ferromagnetic powder in which a hexagonal ferrite type crystal structure is detected as a main phase by X-ray diffraction analysis. The main phase is a structure to which a diffraction peak at the highest intensity in the X-ray diffraction spectrum obtained by the X-ray diffraction analysis is belonged. For example, in a case where the diffraction peak at the highest intensity in the X-ray diffraction spectrum obtained by the X-ray diffraction analysis is belonged to the hexagonal ferrite type crystal structure, it is determined that the hexagonal ferrite type crystal structure is detected as the main phase. In a case where only a single structure is detected by the X-ray diffraction analysis, this detected structure is the main phase. The hexagonal ferrite type crystal structure includes at least an iron atom, a divalent metal atom, and an oxide atom, as the constituent atom. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which main divalent metal atom included in this powder is a strontium atom, and the hexagonal barium ferrite powder is powder in which the main divalent metal atom included in this powder is a barium atom. The main divalent metal atom is a divalent metal atom occupying the greatest content in the divalent metal atom included in the powder based on atom %. Here, the rare earth atom is not included in the divalent metal atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder according to one aspect of the hexagonal ferrite powder will be described more specifically.

An activation volume of the hexagonal strontium ferrite powder is preferably 800 to 1500 $nm^3$. The atomized hexagonal strontium ferrite powder having the activation volume in the range described above is suitable for manufacturing a magnetic tape exhibiting excellent electromagnetic conversion characteristics. The activation volume of the hexagonal strontium ferrite powder is preferably equal to or greater than 800 $nm^3$, and can be, for example, equal to or greater than 850 $nm^3$. In addition, from a viewpoint of further improving electromagnetic conversion characteristics, the activation volume of the hexagonal strontium ferrite powder is more preferably equal to or smaller than 1400 $nm^3$, even more preferably equal to or smaller than 1300 $nm^3$, still preferably equal to or smaller than 1200 $nm^3$, and still more preferably equal to or smaller than 1100 $nm^3$. Regarding the hexagonal barium ferrite powder, the activation volume is preferably in the range described above.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×$10^{-1}$ $J/m^3$.

$$Hc=2Ku/Ms\{1-[(kT/KuV)\ln(At/0.693)]^{1/2}\}$$

[In the expression, Ku: anisotropy constant (unit: $J/m^3$), Ms: saturation magnetization (unit: kA/m), k: Boltzmann's constant, T: absolute temperature (unit: K), V: activation volume (unit: $cm^3$), A: spin precession frequency (unit: $s^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×$10^5$ $J/m^3$, and more preferably have Ku equal to or greater than 2.0×$10^5$ $J/m^3$. In addition, Ku of the hexagonal strontium ferrite powder can be, for example, equal to or smaller than 2.5×$10^5$ $J/m^3$. However, the high Ku is preferable, because it means high thermal stability, and thus, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one aspect, the hexagonal strontium ferrite powder including the rare earth atom can have rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content >1.0. The content of rare earth atom of the hexagonal strontium ferrite powder which will be described later is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content >1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the specification and the specification means a part of the region of the particles configuring the hexagonal strontium ferrite powder from the inside from the surface.

In a case where the hexagonal strontium ferrite powder includes the rare earth atom, the rare earth atom bulk content (bulk content) is preferably 0.5 to 5.0 atom % with respect to 100 atom % of the iron atom. It is thought that the hexagonal strontium ferrite powder including the rare earth atom having the bulk content in the range described above and uneven distribution of the rare earth atom in the surface layer portion of the particles configuring the hexagonal strontium ferrite powder contribute to the prevention of reduction of reproduction output during the repeated reproduction. It is surmised that this is because the anisotropy constant Ku can be increased due to the hexagonal strontium ferrite powder including the rare earth atom having the bulk content in the range described above and uneven distribution of the rare earth atom in the surface layer portion of the particles configuring the hexagonal strontium ferrite powder. As the value of the anisotropy constant Ku is high, occurrence of a phenomenon, so-called thermal fluctuation can be prevented (that is, thermal stability can be improved). By preventing the occurrence of thermal fluctuation, it is possible to prevent reduction of the reproduction output during the repeated reproduction. It is surmised that, the uneven distribution of the rare earth atom in the surface layer portion of the hexagonal strontium ferrite powder contributes to stabilization of a spin at an iron (Fe) site in a crystal lattice of the surface layer portion, thereby increasing the anisotropy constant Ku.

It is surmised that the use of the hexagonal strontium ferrite powder having the rare earth atom surface layer portion uneven distribution as the ferromagnetic powder of the magnetic layer contributes to the prevention of chipping of the surface of the magnetic layer due to the sliding with the magnetic head. That is, it is surmised that the hexagonal strontium ferrite powder having the rare earth atom surface layer portion uneven distribution also contributes to the improvement of running durability of the magnetic tape. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of further preventing the reproduction output in the repeated reproduction and/or a viewpoint of further improving running durability, the content of rare earth atom (bulk content) is more preferably 0.5 to 4.5 atom %, even more preferably 1.0 to 4.5 atom %, and still preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of further preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion/bulk content" greater than 1.0 means that the rare earth atom is unevenly distributed in the surface layer portion (that is, a larger amount of the rare earth atoms is present, compared to that inside), among the particles configuring the hexagonal strontium ferrite powder. In addition, the ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic tape, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-091747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder in the solution is not visually confirmed at the time of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 The element analysis of the solution obtained as described above is performed by an inductively coupled plasma (ICP) analysis device. By doing so, the rare earth atom surface layer portion content with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproducing output in a case of reproducing data recorded on a magnetic tape, it is desirable that the mass magnetization as of ferromagnetic powder included in the magnetic tape is high. In regards to this point, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, it is thought that the hexagonal strontium ferrite powder having the rare earth atom surface layer portion uneven distribution is preferable for preventing such a significant decrease in σs. In one aspect, σs of the hexagonal strontium ferrite powder can be equal to or greater than 45 A·m$^2$/kg and can also be equal to or greater than 47 A·m$^2$/kg. On the other hand, from a viewpoint of noise reduction, σs is preferably equal to or smaller than 80 A·m$^2$/kg and more preferably equal to or smaller than 60 A·m$^2$/kg. σs can be measured by using a well-known measurement device capable of measuring magnetic properties such as an oscillation sample type magnetic-flux meter. In the invention and the specification, the mass magnetization as is a value measured at a magnetic field strength of 15 kOe, unless otherwise noted.

Regarding the content (bulk content) of the constituting atom in the hexagonal strontium ferrite powder, a content of the strontium atom can be, for example, 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, a barium atom and/or a calcium atom can be included. In a case where the other divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can further include a rare earth atom. In addition, the hexagonal strontium ferrite powder may or may not include atoms other than these atoms. As an example the hexagonal strontium ferrite powder may include an aluminum atom (Al). A content of the aluminum atom can be, for example, 0.5 to 10.0 atom % with respect to 100 atom % of the iron atom. From a viewpoint of further preventing the reduction of the reproducing output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

Metal Powder

As a preferred specific example of the ferromagnetic powder, ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be used. In the invention and the specification, the "ε-iron oxide powder" is a ferromagnetic powder having an ε-iron oxide type crystalline structure detected as a main phase by an X-ray diffraction analysis. For example, in a case where the diffraction peak of the highest hardness in the X-ray diffraction spectrum obtained by the X-ray diffraction analysis is belonged to the ε-iron oxide type crystalline structure, it is determined that the ε-iron oxide type crystalline structure is detected as a main phase. As a producing method of the ε-iron oxide powder, a producing method from a goethite, and a reverse micelle method are known. All of the producing methods is well known. For example, for a method of producing the ε-iron oxide powder in which a part of Fe is substituted with a substitutional atom such as Ga, Co, Ti, Al, or Rh, a description disclosed in J. Jpn. Soc. Powder Metallurgy Vol. 61 Supplement, No. S1, pp. S280-S284, J. Mater. Chem. C, 2013, 1, pp. 5200-5206 can be referred to, for example. However, the producing method of the ε-iron oxide powder which can be used as the ferromagnetic powder in the magnetic layer of the magnetic tape is not limited to the method described here.

An activation volume of the ε-iron oxide powder is preferably 300 to 1500 $nm^3$. The atomized ε-iron oxide powder showing the activation volume in the range described above is suitable for manufacturing a magnetic tape exhibiting excellent electromagnetic conversion characteristics. The activation volume of the ε-iron oxide powder is preferably equal to or greater than 300 $nm^3$, and can be, for example, equal to or greater than 500 $nm^3$. From a viewpoint of further improving electromagnetic conversion characteristics, the activation volume of the ε-iron oxide powder is preferably equal to or smaller than 1400 $nm^3$, more preferably equal to or smaller than 1300 $nm^3$, even more preferably equal to or smaller than 1200 $nm^3$, still preferably equal to or smaller than 1100 $nm^3$.

As an index of the reduction of thermal fluctuation, that is, improvement of thermal stability, the anisotropy constant Ku can be used. The ε-iron oxide powder can preferably have Ku equal to or greater than $3.0 \times 10^4$ $J/m^3$, and more preferably have Ku equal to or greater than $8.0 \times 10^4$ $J/m^3$. In addition, Ku of the ε-iron oxide powder can be, for example, equal to or smaller than $3.0 \times 10^5$ $J/m^3$. However, the high Ku is preferable, because it means high thermal stability, and thus, Ku is not limited to the exemplified value.

From a viewpoint of increasing reproducing output in a case of reproducing data recorded on a magnetic tape, it is desirable that the mass magnetization σs of the ferromagnetic powder included in the magnetic tape is high. In regards to this point, in one aspect, the σs of the ε-iron oxide powder can be equal to or greater than 8 $A \cdot m^2/kg$ and equal to or greater than 12 $A \cdot m^2/kg$. On the other hand, from a viewpoint of noise reduction, the σs of the ε-iron oxide powder is preferably equal to or smaller than 40 $A \cdot m^2/kg$ and more preferably equal to or smaller than 35 $A \cdot m^2/kg$.

In the invention and the specification, average particle sizes of various powder such as the ferromagnetic powder and the like are values measured by the following method with a transmission electron microscope, unless otherwise noted.

The powder is imaged at an imaging magnification ratio of 100,000 with a transmission electron microscope, the image is printed on photographic printing paper or displayed on a display so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of a plurality of particles is not limited to an aspect in which particles configuring the aggregate directly come into contact with each other, but also includes an aspect in which a binding agent, an additive, or the like which will be described later is interposed between the particles. A term, particles may be used for representing the powder.

As a method of collecting a sample powder from the magnetic tape in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusifoim shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

In an aspect, the ferromagnetic powder included in the magnetic layer can be a ferromagnetic powder configured with plate-shaped particles. In the invention and the specification, a "plate shape" regarding the shape of the particle is a shape having two opposing plate surfaces. A "plate ratio" is a ratio of a particle size of plate-shaped particles on the plate surface side (that is, plate diameter) to a plate thickness (plate diameter/plate thickness). In the invention and the specification, the plate-shaped powder is a powder in which the plate-shaped particles occupy a largest percentage of the particles configuring this powder. The plate-shaped powder can be a powder in which, for example, the plate-shaped particles occupy 70% or more, 80% or more, 90% or more, or 100% of the powder in terms of the particle number. In regards to the plate-shaped powder, the "average plate ratio" is a value obtained by obtaining an arithmetical mean of the plate diameters (average particle size, that is, average plate diameter) and an arithmetical mean of plate thicknesses (average plate thickness) measured by the same method described above regarding each particle in 500 plate-shaped particles which are randomly extracted, and calculating as "average plate diameter/average plate thickness". The "plate thickness" is a shortest distance between two facing plate surfaces of the plate-shaped particle. The measurement target particles are aligned by applying a magnetic field by a well-known method and imaged, and a plate thickness direction of the particles can be imaged. The inventors have surmised that it is preferable that the ferromagnetic powder included in the magnetic layer is the plate powder, from a viewpoint of ease of controlling the vertical squareness ratio to be in 0.70 to 1.00. From this viewpoint, the average plate ratio of the plate-shaped powder is preferably 1.5 to 4.0 and more preferably 1.5 to 2.5.

The content (filling percentage) of the ferromagnetic powder in the magnetic layer is preferably 50% to 90% by mass and more preferably 60% to 90% by mass. A high filling percentage of the ferromagnetic powder in the magnetic layer is preferable from a viewpoint of improvement of recording density.

Non-Magnetic Powder

The magnetic recording medium can include one or more kinds of non-magnetic powders in the magnetic layer. The non-magnetic powder preferably includes at least a non-magnetic powder contributing to formation of a projection on the surface of the magnetic layer (hereinafter, referred to as a "projection formation agent"). In addition, the magnetic layer also preferably includes a non-magnetic powder capable of functioning as an abrasive (hereinafter, referred to as an "abrasive") as the non-magnetic powder. Hereinafter, the projection formation agent and an abrasive will be described in detail.

Projection Formation Agent

The projection formation agent and an abrasive may be an inorganic powder and an organic powder. Examples of the inorganic powder include powder of inorganic oxide such as metal oxide, metal carbonate, metal sulfate, metal nitride, metal carbide, and metal sulfide, and a powder of inorganic oxide is preferable. An average particle size of the projection formation agent is, for example, preferably 90 to 200 nm and more preferably 100 to 150 nm. In one aspect, from a viewpoint of homogenization of friction properties, particle size distribution of the projection formation agent is not polydispersion having a plurality of peaks in the particle size distribution and is preferably monodisperse showing a single peak. From a viewpoint of availability of monodisperse particles, the projection formation agent is preferably an inorganic powder and more preferably colloidal particles. The "colloidal particles" in the invention and the specification are particles which are not precipitated but dispersed to generate a colloidal dispersion, in a case where 1 g of the particles is added to 100 mL of at least one organic solvent of methyl ethyl ketone, cyclohexanone, toluene, or ethyl acetate, or a mixed solvent including two or more kinds of the solvent described above at a random mixing ratio. The fact that the non-magnetic powder included in the magnetic layer is colloidal particles may be determined by evaluating whether or not such a non-magnetic powder has properties corresponding to the definition of the colloidal particles described above, as long as the non-magnetic powder used in the formation of the magnetic layer can be available. Alternatively, it is also possible to evaluate whether or not the non-magnetic powder extracted from the magnetic layer has properties corresponding to the definition of the colloidal particles described above. The extraction of the non-magnetic powder from the magnetic layer can be performed by a method described in a paragraph 0045 of JP2017-68884A, for example.

Specific examples of the colloidal particles include inorganic oxide colloidal particles such as $SiO_2$, $Al_2O_3$, $TiO_2$, $ZrO_2$, or $Fe_2O_3$, and include colloidal particles of composite inorganic oxide such as $SiO_2 \cdot Al_2O_3$, $SiO_2 \cdot B_2O_3$, $TiO_2 \cdot CeO_2$, $SnO_2 \cdot Sb_2O_3$, $SiO_2 \cdot Al_2O_3 \cdot TiO_2$, $TiO_2 \cdot CeO_2 \cdot SiO_2$. "." used for description of the composite inorganic oxide is used for showing composite inorganic oxide of inorganic oxides described before and after the symbol. For example, $SiO_2 \cdot Al_2O_3$ means composite inorganic oxide of $SiO_2$ and Al$_2$O$_3$, As the colloidal particles, colloidal particles of silicon dioxide (silica), that is, silica colloidal particles (also referred to as "colloidal silica") are particularly preferable. In addition, for the colloidal particles, a description disclosed in paragraphs 0048 and 0049 of JP2017-68884A can also be referred to.

A content of the projection formation agent in the magnetic layer is preferably 0.1 to 10.0 parts by mass, more preferably 0.1 to 5.0 parts by mass, and even more preferably 1.0 to 5.0 parts by mass, with respect to 100.0 parts by mass of the ferromagnetic powder. In the invention and the specification, a given component may be used as one kind or two or more kinds. In a case of using two or more kinds, the content thereof is a total content of two or more kinds.

Abrasive

An abrasive is a component capable of exhibiting ability of removing attachment attached to the magnetic head during the running (abrasive properties). As the abrasive, powders of alumina (Al$_2$O$_3$), silicon carbide, boron carbide (B$_4$C), TiC, chromium oxide (Cr$_2$O$_3$), cerium oxide, zirconium oxide (ZrO$_2$), iron oxide, or diamond which are materials generally used as the abrasive of the magnetic layer can be used, and among these, powders of alumina such as α-alumina, silicon carbide, and diamond are preferable. A content of the abrasive in the magnetic layer is preferably 1.0 to 20.0 parts by mass, more preferably 3.0 to 15.0 parts by mass, and even more preferably 4.0 to 10.0 parts by mass, with respect to 100.0 parts by mass of the ferromagnetic powder. In addition, regarding the particle size of the abrasive, a specific surface area which is an index of the particle size is, for example, equal to or greater than 14 m$^2$/g, preferably equal to or greater than 16 m$^2$/g, and more preferably equal to or greater than 18 m$^2$/g. In addition, the specific surface area of the abrasive can be, for example, equal to or smaller than 40 m$^2$/g. In the invention and the specification, the specific surface area of various powders is a specific surface area measured by a Brunauer-Emmett-Teller (BET) method introduced by Brunauer, Emmett, and Teller by a nitrogen adsorption method based on JIS K 6217-7:2013.

The specific surface area obtained as described above can be an index of a particle size of primary particles of the particles configuring the powder. It is thought that, as the specific surface area is great, the particle size of the primary particles of the particles configuring the powder is small. The specific surface area of various powders used in examples and comparative examples which will be described later is a specific surface area measured regarding a raw material powder used in the preparation of each layer forming composition. However, the powder is extracted from the magnetic recording medium by a well-known method, and the specific surface area of the extracted powder can also be obtained.

Binding Agent and Curing Agent

The magnetic recording medium is a coating type magnetic recording medium and includes a binding agent in the magnetic layer. The binding agent is one or more kinds of resin. As the binding agent, various resins generally used as the binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later. For the binding agent described above, description disclosed in paragraphs 0028 to 0031 of JP2010-024113A can be referred to. The binding agent of the non-magnetic layer will be further described later.

An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions. A content of the binding agent can be, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mmID (inner diameter)×30.0 cm)

Fluent: Tetrahydrofuran (THF)

In addition, a curing agent can also be used together with a resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in a magnetic layer formation step. In a case where a composition used for forming other layers includes a curing agent, the same applies to the layer formed by using this composition. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent, and is preferably 50.0 to 80.0 parts by mass, from a viewpoint of improvement of hardness of the magnetic layer.

Additives

The magnetic layer may include one or more kinds of additives, if necessary. As the additives, the curing agent is used as one example. Examples of the additive included in the magnetic layer include a lubricant, a dispersing agent, a dispersing assistant, an antibacterial agent, an antistatic agent, and an antioxidant. As the additives, a commercially available product can be suitably selected according to the desired properties or manufactured by a well-known method, and can be used with any amount. For example, for the lubricant, a description disclosed in paragraphs 0030 to 0033, 0035, and 0036 of JP2016-126817A can be referred to. The lubricant may be included in the non-magnetic layer which will be described later. For the lubricant which can be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be added to a non-magnetic layer forming composition. For the dispersing agent which can be added to the non-magnetic layer forming composition, a description disclosed in paragraph 0061 of JP2012-133837A can be referred to. As an example of the additive which can be used in the magnetic layer including the abrasive for improving dispersibility of the abrasive, a dispersing agent disclosed in paragraphs 0012 to 0022 of JP2013-131285A can be used.

Various Thicknesses

A thickness of the magnetic layer can be optimized according to a saturation magnetization amount of a magnetic head used, a head gap length, a recording signal band, and the like. The thickness of the magnetic layer is preferably equal to or smaller than 100 nm, more preferably 10 to 100 nm, and even more preferably 20 to 90 nm, from a viewpoint of realization of high-density recording. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is a total thickness of the layers.

Non-Magnetic Layer

The magnetic recording medium includes a non-magnetic layer between the non-magnetic support and the magnetic layer.

Thickness of Non-Magnetic Layer

A thickness of the non-magnetic layer is preferably equal to or smaller than 1.00 μm, more preferably equal to or smaller than 0.80 μm, and even more preferably equal to or smaller than 0.60 μm. A thin non-magnetic layer may contribute to a decrease in value of the interface variation rate between the magnetic layer and the non-magnetic layer. In addition, the thickness of the non-magnetic layer is preferably equal to or greater than 0.05 μm, more preferably equal to or greater than 0.07 μm, and even more preferably equal to or greater than 0.1 μm, from a viewpoint of ease of evenly applying the non-magnetic layer forming composition. In a case where the evenness of the coating of the non-magnetic layer forming composition is decreased, the value of the interface variation rate tends to increase.

Non-Magnetic Powder

As the non-magnetic powder included in the non-magnetic layer, only one kind of the non-magnetic powder may be used, and two or more kinds of non-magnetic powder may be used. As the non-magnetic powder, at least carbon black is preferably used. As carbon black, a commercially available product may be used or carbon black manufactured by a well-known method can also be used.

By using a non-magnetic powder having a small particle size as the non-magnetic powder included in the non-magnetic layer and increasing dispersibility of the non-magnetic powder, the void volume of the non-magnetic layer tends to decrease. In addition, the use of a non-magnetic powder having a small particle size as the non-magnetic powder included in the non-magnetic layer and an increase of dispersibility of the non-magnetic powder can contribute to a decrease in roughness of the surface of the non-magnetic layer. This contributes to a decrease in value of the interface variation rate between the magnetic layer and the non-magnetic layer. In addition, it is also preferable to decrease the roughness of the surface of the non-magnetic layer, from a viewpoint of ease of controlling the vertical squareness ratio to be 0.70 to 1.00. For example, regarding the carbon black, the specific surface area can be used as an index of the particle size. From a viewpoint of decreasing the void volume of the non-magnetic layer, the specific surface area of carbon black is preferably equal to or greater than 280 $m^2/g$, and more preferably equal to or greater than 300 $m^2/g$. From a viewpoint of ease of improvement of dispersibility, the specific surface area of carbon black is preferably equal to or smaller than 500 $m^2/g$, and more preferably equal to or smaller than 400 $m^2/g$. A ratio of carbon black occupying the non-magnetic powder of the non-magnetic layer is preferably equal to or greater than 30.0% by mass, more preferably equal to or greater than 40.0% by mass, even more preferably equal to or greater than 50.0% by mass, and may be equal to or greater than 60.0% by mass, equal to or greater than 70.0% by mass, equal to or greater than 80.0% by mass, equal to or greater than 90.0% by mass, or 100.0% by mass (that is, the non-magnetic powder only includes carbon black), with respect to a total amount of the non-magnetic powder. In addition, the ratio of carbon black occupying the non-magnetic powder of the non-magnetic layer can be, for example, equal to or smaller than 90.0% by mass, or can be equal to or smaller than 80.0% by mass, with respect to a total amount of the non-magnetic powder. However, as described above, the non-magnetic powder of the non-magnetic layer may only include carbon black. A content (filling percentage) of the non-magnetic powder in the non-magnetic layer is preferably 50% to 90% by mass and more preferably 60% to 90% by mass.

As the non-magnetic powder other than carbon black, an inorganic powder may be used or an organic powder may be used. An average particle size of these non-magnetic powders is preferably 10 to 200 nm and more preferably 10 to 100 nm.

Examples of the inorganic powder include powders of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to, for example.

Binding Agent

The non-magnetic layer can include a binding agent. According to the studies of the inventors, regarding the improvement of dispersibility of carbon black, it was found that the use of a vinyl chloride resin as a binding agent causes a useful tendency to the improvement of dispersibility of carbon black. From a viewpoint of the improvement of dispersibility of carbon black, at least a vinyl chloride resin is preferably used as the binding agent of the non-magnetic layer, and in a case of using a plurality of kinds of resins as the binding agent, it is preferable to increase a ratio of the vinyl chloride resin. For example, in an aspect, a ratio of the vinyl chloride resin is preferably equal to or greater than 30.0% by mass, more preferably equal to or greater than 50.0% by mass, even more preferably equal to or greater than 80.0% by mass, and still more preferably 90.0% by mass to 100.0% by mass, with respect to a total amount of the binding agent of the non-magnetic layer. In addition, the content of the binding agent in the non-magnetic layer can be, for example, 10.0 to 40.0 parts by mass with respect to 100.0 parts by mass of the non-magnetic powder.

Additives

A non-magnetic layer forming composition can be, for example, prepared by mixing non-magnetic powder, a binding agent, and one or more kinds of additives and one or more kinds of solvents which are randomly added, with each other at the same time or in order and performing a dispersion process. Details of the dispersion process will be described later. As the dispersion time becomes longer, the dispersibility of the non-magnetic powder in the non-magnetic layer tends to be improved and void volume tends to decrease. In addition, it is possible to improve dispersibility of the non-magnetic powder in the non-magnetic layer, by causing the non-magnetic layer forming composition to include an additive (dispersing agent) which contributes to the improvement of dispersibility of the non-magnetic powder.

As the dispersing agent, one or more kinds of well-known dispersing agent can be used according to the kinds of the non-magnetic powder of the non-magnetic layer. For example, organic tertiary amine can be used as the dispersing agent of carbon black. For the organic tertiary amine, a description disclosed in paragraphs 0011 to 0018 and 0021 of JP2013-049832A can be referred to. In addition, for treatment or the like of the composition for increasing dispersibility of carbon black by the organic tertiary amine, a description disclosed in paragraphs 0022 to 0024 and 0027 of JP2013-049832A can be referred to.

The amine is more preferably trialkyl amine. An alkyl group including trialkyl amine is preferably an alkyl group having 1 to 18 carbon atoms. Three alkyl groups included in the trialkyl amine may be the same as each other or different from each other. For details of the alkyl group, a description disclosed in paragraphs 0015 and 0016 of JP2013-049832A can be referred to. As trialkyl amine, trioctylamine is particularly preferable.

In the non-magnetic layer, one or more kinds of well-known other additives can be suitably selected from commercially available products according to the desired properties or manufactured by a well-known method and used in a random amount.

In the invention and the specification, the non-magnetic layer also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 100 Oe, or a layer having a residual magnetic flux density equal to or smaller than 10 mT and coercivity equal to or smaller than 100 Oe. It is preferable that the non-magnetic layer does not have a residual magnetic flux density and coercivity.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating process may be performed with respect to these supports in advance. A thickness of the non-magnetic support is, for example, 3.00 to 80.00 μm, preferably 3.00 to 50.00 μm, and more preferably 3.00 to 10.00 μm.

Back Coating Layer

The magnetic recording medium can also include a back coating layer including a non-magnetic powder on a surface of the non-magnetic support opposite to the surface provided with the magnetic layer. The back coating layer preferably includes any one or both of carbon black and inorganic powder. For details of the back coating layer, a well-known technology regarding the back coating layer can be applied.

In addition, the back coating layer can include a binding agent. For the binding agent included in the back coating layer and various additives which can be randomly included therein, a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to. A thickness of the back coating layer is preferably equal to or smaller than 0.90 μm and more preferably 0.10 to 0.70 μm.

Manufacturing Step

Preparation of Each Layer Forming Composition

Composition for forming the magnetic layer, the non-magnetic layer, or the back coating layer generally includes a solvent, together with the various components described above. As the solvent, one kind or two or more kinds of various solvents generally used for manufacturing a coating type magnetic recording medium can be used. The content of the solvent in each layer forming composition is not particularly limited. For the solvent, a description disclosed in a paragraph 0153 of JP2011-216149A can be referred to. A concentration of solid content and a solvent composition in each layer forming composition may be suitably adjusted according to handleability of the composition, coating conditions, and a thickness of each layer to be formed. Steps of preparing the composition for forming the magnetic layer, the non-magnetic layer, or the back coating layer generally include at least a kneading step, a dispersing step, and a mixing step provided before and after these steps, if necessary. Each step may be divided into two or more stages. All of raw materials used in the preparation of each layer forming composition may be added at an initial stage or in a middle stage of each step. In addition, each raw material may be separately added in two or more steps. For example, the binding agent may be separately added in the kneading step, the dispersing step, and a mixing step for adjusting a viscosity after the dispersion. In the manufacturing step of the magnetic recording medium, a well-known manufacturing technology of the related art can be used as a part of step. In the kneading step, an open kneader, a continuous kneader, a pressure kneader, or a kneader having a strong kneading force such as an extruder is preferably used. The details of the kneading step are disclosed in JP1989-106338A (JP-H01-106338A) and JP1989-79274A (JP-H01-79274A). As a disperser, various well known disperser using a shear force such as a beads mill, a ball mill, a sand mill, or a homogenizer can be used. In the dispersion, the dispersion beads can be preferably used. As dispersion beads, ceramic beads or glass beads are used and zirconia beads are preferable. A combination of two or more kinds of beads may be used. A bead diameter (particle diameter) and a beads filling percentage of the dispersion beads are not particularly limited and may be suitably set according to powder which is a dispersion target. Each layer forming composition may be filtered by a well-known method before performing the coating step. The filtering can be performed by using a filter, for example. As the filter used in the filtering, a filter having a hole diameter of 0.01 to 3 (for example, filter made of glass fiber or filter made of polypropylene) can be used, for example.

Coating Step

The non-magnetic layer and the magnetic layer can be formed by performing multilayer coating of the non-magnetic layer forming composition and the magnetic layer forming composition in order or at the same time. The back coating layer can be formed by applying the back coating layer forming composition to the surface of the non-magnetic support opposite to a surface provided with the non-magnetic layer and the magnetic layer (or to be provided with the non-magnetic layer and/or the magnetic layer). For details of the coating for forming each layer, a description disclosed in a paragraph 0066 of JP2010-231843A can be referred to.

Other Steps

For various other steps for manufacturing the magnetic recording medium, a description disclosed in paragraphs 0067 to 0070 of JP2010-231843A can be referred to, for example. For example, in an aspect of performing an alignment process, while the coating layer of the magnetic layer forming composition is wet, the alignment process is performed with respect to the coating layer in an alignment zone. For the alignment process, various technologies disclosed in a paragraph 0052 of JP2010-024113A can be applied. For example, a homeotropic alignment process can be performed by a well-known method such as a method using a different polar facing magnet. In the alignment zone, a drying speed of the coating layer can be controlled by a temperature, an air flow of the dry air and/or a transporting rate in the alignment zone. In addition, the coating layer may be preliminarily dried before transporting to the alignment zone. As an example, the magnetic field strength of the homeotropic alignment process can be 0.10 to 0.80 T or 0.10 to 0.60 T. In addition, it is preferable to perform a calendar process as a process for increasing a surface smoothness of the magnetic recording medium. For example, as a roll having a hard surface is used as a calendar roll or as the number of steps of a calendar roll increases, the value of the magnetic layer surface Ra tends to decrease. Regarding the conditions of the calendar process, for example, a calendar pressure (linear pressure) can be 200 to 500 kN/m and is preferably 250 to 350 kN/m. A calendar temperature (surface temperature of a calendar roll) can be, for example, 70° C. to 120° C. and is preferably 80° C. to 100° C., and the calendar speed can be, for example, 50 to 300 m/min and is preferably 50 to 200 m/min.

Formation of Servo Pattern

A servo pattern can be formed on the magnetic recording medium manufactured as described above by a well-known method, in order to realize tracking control of a magnetic head of the magnetic recording and reproducing device and control of a running speed of the magnetic recording medium. The "formation of the servo pattern" can be "recording of a servo signal". The magnetic recording medium may be a tape-shaped magnetic recording medium (magnetic tape) or a disk-shaped magnetic recording medium (magnetic disk). Hereinafter, the formation of the servo pattern will be described using a magnetic tape as an example.

The servo pattern is generally formed along a longitudinal direction of the magnetic tape. As a method of control using a servo signal (servo control), timing-based servo (TBS), amplitude servo, or frequency servo is used.

As shown in European Computer Manufacturers Association (ECMA)-319, a timing-based servo system is used in a magnetic tape based on a linear tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape.

As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In one aspect, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 is used. In this staggered method, the group of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319, information showing the position in the longitudinal direction of the magnetic tape (also referred to as "Longitudinal Position (LPOS) information") is normally embedded in each servo band. This LPOS information is recorded so that the position of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo patterns to be formed. The width of each gap can be set as, for example, equal to or smaller than 1 µm, 1 to 10 µm, or equal to or greater than 10 µm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the vertical DC erasing is performed to the magnetic tape, the formation of the servo pattern is performed so that the direction of the magnetic field and the direction of erasing becomes opposite to each other. Accordingly, the output of the servo signal obtained by the reading of the servo pattern can be increased. As disclosed in JP2012-053940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

The magnetic tape is generally accommodated in a magnetic tape cartridge and the magnetic tape cartridge is mounted in a magnetic recording and reproducing device.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic recording and reproducing device in order to record and/or reproduce data to the magnetic tape, the magnetic tape is drawn from the magnetic tape cartridge and wound around the reel on the magnetic recording and reproducing device side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the magnetic recording and reproducing device side. In the meantime, the magnetic head comes into contact with and slides on the surface of the magnetic layer of the magnetic tape, and accordingly, the recording and/or reproduction of the data is performed. With respect to this, in the twin reel type magnetic tape cartridge, both reels of the supply reel and the winding reel are provided in the magnetic tape cartridge. The magnetic tape cartridge may be any of single reel type magnetic tape cartridge and twin reel type magnetic tape cartridge. For other details of the magnetic tape cartridge, a well-known can be used.

Magnetic Recording and Reproducing Device

One aspect of the invention relates to a magnetic recording and reproducing device including the magnetic recording medium and a magnetic head.

In the invention and the specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type magnetic recording and reproducing device is a device in which a surface of a magnetic layer and a magnetic head are in contact with each other and slide on each other, in a case of performing the recording of data on a magnetic recording medium and/or the reproducing of the recorded data.

The magnetic head included in the magnetic recording and reproducing device can be a recording head capable of performing the recording of data on the magnetic recording medium, and can also be a reproducing head capable of performing the reproducing of data recorded on the magnetic recording medium. In addition, in an aspect, the magnetic recording and reproducing device can include both of a recording head and a reproducing head as separate magnetic heads. In another aspect, the magnetic head included in the magnetic recording and reproducing device can also have a configuration of comprising both of an element for recording data (recording element) and an element for reproducing data (reproducing element) in one magnetic head. Hereinafter, the element for recording data and the element for reproducing are collectively referred to as "elements for data". As the reproducing head, a magnetic head (MR head) including a magnetoresistive (MR) element capable of reading data recorded on the magnetic tape with excellent sensitivity as the reproducing element is preferable. As the MR head, various well-known MR heads such as an Anisotropic Magnetoresistive (AMR) head, a Giant Magnetoresistive (GMR) head, or a Tunnel Magnetoresistive (TMR) can be used. In addition, the magnetic head which performs the recording of data and/or the reproducing of data may include a servo reading element. Alternatively, as a head other than the magnetic head which performs the recording of data and/or the reproducing of data, a magnetic head (servo head) comprising a servo reading element may be included in the magnetic recording and reproducing device. The magnetic head which performs the recording of data and/or reproducing of the recorded data (hereinafter, also referred to as a "recording and reproducing head") can include two servo signal reading elements, and each of the two servo signal reading elements can read two adjacent servo bands at the same time. One or a plurality of elements for data can be disposed between the two servo signal reading elements.

In the magnetic recording and reproducing device, the recording of data on the magnetic recording medium and/or the reproducing of data recorded on the magnetic recording medium can be performed by bringing the surface of the magnetic layer of the magnetic recording medium into contact with the magnetic head and sliding. The magnetic recording and reproducing device may include the magnetic recording medium according to an aspect of the invention, and well-known technologies can be applied for the other configurations.

For example, in a case of the recording of data on the magnetic recording medium on which the servo pattern is formed and/or the reproducing of the recorded data, first, the tracking is performed by using the servo signal obtained by the reading of the servo pattern. That is, as the servo signal reading element follows a predetermined servo track, the element for data is controlled to pass on the target data track. The movement of the data track is performed by changing the servo track to be read by the servo signal reading element in the tape width direction.

In addition, the recording and reproducing head can perform the reading and/or the reproducing with respect to other data bands. In this case, the servo signal reading element is moved to a predetermined servo band by using the UDIM information described above, and the tracking with respect to the servo band may be started.

EXAMPLES

Hereinafter, the invention will be described with reference to examples. However, the invention is not limited to aspects shown in the examples. "Parts" in the following description is based on mass. In addition, steps and evaluations described below are performed in an environment of an atmosphere temperature of 23° C.±1° C., unless otherwise noted.

Example 1

List of magnetic layer forming composition
Magnetic Liquid
Hexagonal barium ferrite powder (in Table 1, "BaFe"): 100.0 parts
(Average particle size: 17 nm, average plate ratio: 2.5, activation volume: 1,300 nm$^3$)
Oleic acid: 1.5 parts
A vinyl chloride resin: 10.0 parts
(MR-104 manufactured by Kaneka Corporation)
A polyurethane resin: 4.0 parts
(UR-4800 manufactured by Toyobo Co., Ltd. (sulfonic acid group-containing polyester polyurethane resin))
Methyl ethyl ketone: 300.0 parts
Cyclohexanone: 300.0 parts
Abrasive Solution
Lumina powder (α-alumina having a specific surface area of 19 m$^2$/g): 9.0 parts
A polyurethane resin: 0.7 parts
(MR-110 manufactured by Kaneka Corporation)
Cyclohexanone: 20.0 parts
Projection Formation Agent Liquid
Silica colloidal particles (colloidal silica) (average particle size: 150 nm): 2.0 parts
Methyl ethyl ketone: 8.0 parts
Other Components
Stearic acid: 1.0 part
Stearic acid amide: 0.3 parts
Butyl stearate: 1.5 parts
Methyl ethyl ketone: 110.0 parts
Cyclohexanone: 110.0 parts
Polyisocyanate (CORONATE L manufactured by Tosoh Corporation): 2.5 parts
List of Non-Magnetic Layer Forming Composition
Carbon black: 100.0 parts
(specific surface area: see Table 1, Dibutyl phthalate (DBP) oil absorption amount: 65 cm$^3$/100 g)
Trioctylamine: 4.0 parts
A vinyl chloride resin: see Table 1
(MR-104 manufactured by Kaneka Corporation)
Methyl ethyl ketone: 510.0 parts
Cyclohexanone: 200.0 parts
Stearic acid: 1.5 parts
Stearic acid amide: 0.3 parts
Butyl stearate: 1.5 parts
List of Back Coating Layer Forming Composition
Carbon black: 100.0 parts
(average particle size: 40 nm, DBP oil absorption amount: 74 cm$^3$/100 g)
Copper phthalocyanine: 3.0 parts
Nitrocellulose: 25.0 parts
A polyurethane resin: 60.0 parts
(UR-8401 manufactured by Toyobo Co., Ltd. (sulfonic acid group-containing polyester polyurethane resin))
A polyester resin: 4.0 parts
(VYLON 500 manufactured by Toyobo Co., Ltd.)
Alumina powder (α-alumina having a specific surface area of 17 m$^2$/g): 1.0 part
Polyisocyanate: 15.0 parts
(CORONATE L manufactured by Tosoh Corporation)
Methyl ethyl ketone: 600.0 parts
Toluene: 600.0 parts
Preparation of Each Layer Forming Composition
The magnetic layer forming composition was prepared by the following method.

The components of the magnetic liquid were mixed and dispersed by an open kneader and the dispersion process of 30 passes was performed by a transverse beads mill disperser with zirconia (ZrO$_2$) beads having a bead diameter of 0.1 mm (hereinafter, referred to as "Zr beads"), by setting a bead filling percentage as 80 volume %, a circumferential speed of rotor distal end as 10 m/sec, and a retention time for 1 pass as 2 minutes.

Regarding the abrasive solution, a mixture of the components of the abrasive solution described above (alumina powder, vinyl chloride resin, and cyclohexanone) was prepared, this mixture was put in a transverse beads mill disperser together with Zr beads having a bead diameter of 0.3 mm, so as to perform the adjustment so that a value of bead volume/(abrasive solution volume+bead volume) was 80%, the beads mill dispersion process was performed for 120 minutes, the liquid after the process was extracted, and an ultrasonic dispersion filtering process was performed by using a flow type ultrasonic dispersion filtering device.

The magnetic layer forming composition was prepared by introducing the magnetic liquid, the abrasive solution, the projection formation agent, and the other components in a dissolver stirrer, stirring the mixture at a circumferential speed of 10 m/sec for 30 minutes, and performing a process of 3 passes at a flow rate of 7.5 kg/min with a flow type ultrasonic disperser, and filtering the mixture with a filter having a hole diameter of 1 μm.

A non-magnetic layer forming composition was prepared as follows.

The components excluding a lubricant (stearic acid, stearic acid amide, and butyl stearate) were mixed and dispersed by an open kneader, and the dispersion process was performed by a transverse beads mill disperser. After that, the lubricant (stearic acid, stearic acid amide, and butyl stearate), and methyl ethyl ketone for adjusting coating thickness were added, stirred with a dissolver stirrer and mixed, to prepare a non-magnetic layer forming composition.

In Example 1, and Examples 2 to 4 and Comparative Examples 1 to 6 which will be described later, in a case of preparing the non-magnetic layer forming composition, methyl ethyl ketone for adjusting a coating thickness was used with an amount of 70.0 to 510.0 parts by mass with respect to 100.0 parts by mass of the non-magnetic powder used for preparing the non-magnetic layer forming composition.

A back coating layer forming composition was prepared as follows.

The components excluding polyisocyanate were introduced in a dissolver stirrer and stirred at a circumferential speed of 10 m/sec for 30 minutes, and subjected to a dispersion process by a transverse beads mill disperser. After that, polyisocyanate was added, stirred and mixed in a dissolver stirrer to prepare a back coating layer forming composition.

Preparation of Magnetic Tape

The non-magnetic layer forming composition was applied to one surface of a biaxial stretching polyethylene naphthalate support having a thickness of 6.00 μm so that the thickness after the drying becomes a thickness shown in Table 1 and was dried, to form a non-magnetic layer. The magnetic layer forming composition was applied onto the non-magnetic layer so that the thickness after the drying becomes 70 nm, to form a coating layer. A homeotropic alignment process of applying a magnetic field having a magnetic field strength of 0.15 T in a vertical direction with respect to a surface of the coating layer, while the formed coating layer of the magnetic layer forming composition is wet (not dried). Then, the coating layer was dried and a magnetic layer was formed. After that, the back coating layer forming composition was applied to the surface of the support opposite to the surface, where the non-magnetic layer and the magnetic layer were formed, so that a thickness after the drying becomes 0.50 μm and dried. Then, a calendar process was performed by using a calendar processing device configured with only a metal roll, at a speed of 100 m/min, linear pressure of 294 kN/m, and a calendar temperature of 100° C. After that, the heat treatment was performed in the environment of the atmosphere temperature of 70° C. for 36 hours. After the heat treatment, a magnetic tape was obtained by slitting to have a width of ½ inches (1 inch=0.0254 meters).

Examples 2 to 4 and Comparative Examples 1 to 6

A magnetic tape was manufactured by the same method as in Example 1, except that various conditions were changed as shown in Table 1. A thickness of the non-magnetic layer was adjusted by the amount of methyl ethyl ketone used for adjusting the coating thickness used during the preparation of the non-magnetic layer forming composition. The polyurethane resin used for preparing the non-magnetic layer forming composition in the comparative example is UR-4800 manufactured by Toyobo Co., Ltd. (sulfonic acid group-containing polyester polyurethane resin).

In Comparative Examples 4 and 5, in order to prepare the non-magnetic layer forming composition, the amount of carbon black (specific surface area: 260 m$^2$/g) was set as 20.0 parts by mass, and 80.0 parts by mass of α-iron oxide (average particle size (average long axis length): 150 nm) was used.

In Comparative Example 6, the thickness of the magnetic layer was adjusted by the coating amount of the magnetic layer forming composition.

Example 5

As the ferromagnetic powder, a magnetic tape was manufactured by the same method as in Example 1, except that a hexagonal strontium ferrite powder (in Table 1, "SrFe1") prepared by the following method was used instead of the hexagonal barium ferrite powder.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed in a mixer to obtain a raw material mixture The obtained raw material mixture was dissolved in a platinum crucible at a dissolving temperature of 1390° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roller to prepare an amorphous body.

280 g of the prepared amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 18 nm, an activation volume was 902 nm$^3$, an anisotropy constant Ku was 2.2×10$^5$ J/m$^3$, and a mass magnetization σs was 49 A·m$^2$/kg.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface portion content of the neodymium atom was 8.0 atom %. A ratio of the surface portion content and the bulk content, "surface portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the condition of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degrees Example 6

As the ferromagnetic powder, a magnetic tape was manufactured by the same method as in Example 1, except that a hexagonal strontium ferrite powder (in Table 1, "SrFe2") prepared by the following method was used instead of the hexagonal barium ferrite powder.

1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ were weighed and mixed in a mixer to obtain a raw material mixture.

The obtained raw material mixture was dissolved in a platinum crucible at a dissolving temperature of 1380° C., and a tap hole provided on the bottom of the platinum crucible was heated while stirring the dissolved liquid, and the dissolved liquid was tapped in a rod shape at approximately 6 g/sec. The tap liquid was cooled and rolled with a water cooling twin roll to prepare an amorphous body.

280 g of the obtained amorphous body was put into an electronic furnace, heated to 645° C. (crystallization temperature), and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 19 nm, an activation volume was 1102 $nm^3$, an anisotropy constant Ku was $2.0 \times 10^5$ $J/m^3$, and a mass magnetization as was 50 $A \cdot m^2/kg$.

Evaluation Method (1) Vertical Squareness Ratio

Regarding each magnetic tape of the examples and the comparative examples, a vertical squareness ratio of was obtained by the method described above using an oscillation sample type magnetic-flux meter (manufactured by Toei Industry Co., Ltd.) at a measurement temperature of 23° C.±1° C.

(2) Magnetic Layer Surface Ra

Regarding the surface of the magnetic layer, a center line average roughness Ra (arithmetical mean of values obtained by the measurement in which n=3) was obtained by setting the size of the measurement region as 40 μm×40 μm. Nanoscope 4 manufactured by Veeco Instruments, Inc. was used as the AFM in a tapping mode, RTESP-300 manufactured by Bruker Corporation was used as a probe of AFM, a resolution was set as 512 pixel×512 pixel, a scanning speed was set as a speed measured in a case where the scanning speed in one screen (512 pixel×512 pixel) was 341 seconds.

(3) Interface Variation Rate between Magnetic Layer and Non-Magnetic Layer, Void Volume of Non-Magnetic Layer, and Various Thicknesses The sample for cross section observation was prepared by the following method. The interface variation rate between the magnetic layer and the non-magnetic layer, the void volume of the non-magnetic layer, and thicknesses of the non-magnetic layer and the magnetic layer were obtained by using the prepared sample for cross section observation by the method described above. FE-SEM S4800 manufactured by Hitachi, Ltd. was used as a field emission type scanning electron microscope (FE-SEM) for SEM observation.

(i) A sample of the magnetic tape having a size of a width direction 10 mm×longitudinal direction 10 mm was cut by using a blade.

A protective film was formed on the surface of the magnetic layer of the cut sample to obtain the sample attached with the protective film. The formation of the protective film was performed by the following method.

A platinum (Pt) film (thickness of 30 nm) was formed on the surface of the magnetic layer of the sample by sputtering. The sputtering of the platinum film was performed under the following conditions.

Sputtering Conditions of Platinum Film
Target: Pt
Degree of vacuum in chamber of sputtering device: equal to or smaller than 7 Pa
Current value: 15 mA A carbon film having a thickness of 100 to 150 nm was further formed on the sample attached with platinum film manufactured described above. The formation of the carbon film was performed by a chemical vapor deposition (CVD) mechanism using a gallium ion (Ga+) beam provided with a focused ion beam (FIB) device used in the following section (ii).

(ii) The FIB processing using the gallium ion (Ga+) beam was performed with respect to the sample attached with the protective film manufactured in the section (i) by the FIB device and the cross section of the magnetic tape was exposed. An acceleration voltage in the FIB processing was 30 kV and a probe current was 1300 pA.

The sample for cross section observation exposed as described above was used for SEM observation for obtaining the interface variation rate between the magnetic layer and the non-magnetic layer, the void volume, and the various thicknesses.

In Comparative Example 3, a portion where the non-magnetic layer was not applied existed on an interface portion between the magnetic layer and the non-magnetic layer on the SEM image obtained by the SEM observation.

(4) Electromagnetic Conversion Characteristics (Signal-to-Noise-Ratio (SNR))

Regarding each magnetic tape of the examples and the comparative examples, an SNR was measured with a reel tester having a width of ½ inches to which a magnetic head was fixed, in an environment of a temperature of 23° C. and relative humidity of 45%. A magnetic head/magnetic tape relative speed was set as 6 m/sec. The recording was performed by using a metal-in-gap (MIG) head (gap length of 0.15 µm, track width of 1.0 µm), and a recording current was set as an optimal recording current of each magnetic tape. As a reproducing head, a GMR head having an element thickness of 15 nm, a shield interval of 0.1 µm, and a lead width of 0.5 µm was used. A signal having linear recording density (270 kfci) was recorded, a reproducing signal was measured with a spectrum analyzer manufactured by Shiba-soku Co., Ltd., and a ratio of an output of a carrier signal and integral noise over whole spectral range was set as an SNR. The unit kfci is a unit of linear recording density (cannot be converted into the unit SI). As the signal, a part of a signal which is sufficiently stabilized after starting the running of the magnetic tape was used. The SNR was measured by causing each magnetic tape to run (250 reciprocating) 500 passes at 800 m per 1 pass. In addition, a difference between SNR of the first pass and SNR of 500-th pass (SNR of 500-th pass–SNR of the first pass) was obtained, and is shown in Table 1 as a "decrease in SNR after 500 pass running". In a case where the difference is smaller than −2.0 dB, a magnetic tape having a small deterioration in electromagnetic conversion characteristics after the repeated running.

In addition, each magnetic tape of the examples and the comparative examples was caused to run by 500 passes, and then the surface of the reproducing head was observed with an optical microscope (objective lens, magnification of 20). A case where the attachment of scraps of the magnetic layer to the reproducing head was observed is shown as "-", a case where the attachment of scraps of the magnetic layer was observed is evaluated as "chipping of magnetic layer", and the evaluation results are shown in Table 1. However, in a case where the clear peeling was visually observed on the surface of the magnetic layer after 500 pass running, the observation of the reproducing head with an optical microscope was not performed, and the evaluation result shown in Table 1 was shown as "peeling of magnetic layer".

(5) Projection Maintaining Ability during Repeated Running

Regarding each magnetic tape of the examples and the comparative examples, the number of projections having a height equal to or greater than 5 nm on the surface of the magnetic layer, in a state before the running and a state after the 500 pass running of the section (4) was measured with AFM under the conditions shown in the section (2). A ratio of the number of projections (number of projections after 500 pass running/number of projections in a state before running) is shown in Table 1 as the evaluation result of the "projection maintaining ability during repeated running". However, in a case where the clear peeling was visually observed on the surface of the magnetic layer after 500 pass running, the observation of the reproducing head with an optical microscope was not performed, and the evaluation result shown in Table 1 was shown as "peeling of magnetic layer".

The results described above are shown in Table 1.

TABLE 1

| | | | Non-magnetic layer | | | | |
| --- | --- | --- | --- | --- | --- | --- | --- |
| | | Thickness | Non-magnetic powder | | Binding agent | | Thickness of |
| | Ferromagnetic powder | of magnetic layer [nm] | Type | Specific surface area [m²/g] | Vinyl chloride resin [parts by mass] | Polyurethane resin [parts by mass] | non-magnetic layer [µm] | Void volume [%] |
| Example 1 | BaFe | 70 | Carbon black | 320 | 30.0 | None | 0.40 | 2.5 |
| Example 2 | BaFe | 70 | Carbon black | 320 | 30.0 | None | 0.10 | 1.8 |
| Example 3 | BaFe | 70 | Carbon black | 320 | 30.0 | None | 0.80 | 8.2 |
| Example 4 | BaFe | 70 | Carbon black | 320 | 30.0 | None | 0.05 | 1.3 |
| Examples | SrFe1 | 70 | Carbon black | 320 | 30.0 | None | 0.40 | 2.5 |
| Example 6 | SrFe2 | 70 | Carbon black | 320 | 30.0 | None | 0.40 | 2.5 |
| Comparative Example 1 | BaFe | 70 | Carbon black | 260 | 12.0 | 8.0 | 1.00 | 23.0 |
| Comparative Example 2 | BaFe | 70 | Carbon black | 260 | 70.0 | None | 0.40 | 1.3 |
| Comparative Example 3 | BaFe | 70 | Carbon black | 320 | 30.0 | None | 0.02 | 0.9 |
| Comparative Example 4 | BaFe | 70 | Carbon black (specific surface area of 260 m²/g) + α-iron oxide (average particle size of 150 nm) | | None | 6.0 | 0.40 | 17.0 |

TABLE 1-continued

| | | | | | | | |
|---|---|---|---|---|---|---|---|
| Comparative Example 5 | BaFe | 70 | Carbon black (specific surface area of 260 m²/g) + α-iron oxide average particle size of 150 mm) | None | 6.0 | 0.10 | 16.0 |
| Comparative Example 6 | BaFe | 200 | Carbon black | 260 | 12.0 | 8.0 | 1.00 | 23.0 |

| | | | | Evaluation result | | | |
|---|---|---|---|---|---|---|---|
| | Interface variation rate [%] | Vertical squareness ratio | Magnetic layer surface Ra [nm] | SNR (first pass) [dB] | SNR decrease after 500 pass running [dB] | Projection maintaining ability during repeated running | Observation result of reproducing head after 500 pass running |
| Example 1 | 2.0 | 0.79 | 2.0 | 1.5 | −0.5 | 0.72 | — |
| Example 2 | 1.5 | 0.85 | 2.2 | 2.0 | −0.3 | 0.82 | — |
| Example 3 | 2.4 | 0.73 | 1.5 | 1.0 | −0.8 | 0.65 | — |
| Example 4 | 1.0 | 0.75 | 2.0 | 1.0 | −0.3 | 0.85 | — |
| Examples | 2.0 | 0.73 | 2.0 | 2.3 | −0.5 | 0.72 | |
| Example 6 | 1.5 | 0.75 | 2.2 | 2.0 | −0.5 | 0.72 | |
| Comparative Example 1 | 4.0 | 0.61 | 2.3 | 0.0 (reference) | −2.3 | 0.22 | Chipping of magnetic layer |
| Comparative Example 2 | 2.5 | 0.70 | 3.5 | −2.0 | −0.5 | 0.70 | |
| Comparative Example 3 | 4.5 | 0.60 | 2.8 | −0.1 | −3.0 | Peeling of magnetic layer | Peeling of magnetic layer |
| Comparative Example 4 | 4.6 | 0.60 | 2.8 | −0.1 | −3.0 | 0.25 | Chipping of magnetic layer |
| Comparative Example 5 | 4.0 | 0.61 | 2.2 | 0.0 | −2.5 | 0.18 | Chipping of magnetic layer |
| Comparative Example 6 | 4.0 | 0.70 | 2.5 | −2.3 | −2.8 | 0.12 | Chipping of magnetic layer |

From the results shown in Table 1, in the magnetic tapes of Examples 1 to 6, excellent electromagnetic conversion characteristics can be observed. In addition, from the result shown in Table 1, in the magnetic tapes of Examples 1 to 6, the prevention of a deterioration in electromagnetic conversion characteristics after the repeated running can be observed.

The invention is effective in a technical field of various magnetic recording media such as a magnetic tape for data storage.

What is claimed is:

1. A magnetic recording medium comprising:
   a non-magnetic support; and
   a non-magnetic layer including a non-magnetic powder and a magnetic layer including a ferromagnetic powder on the non-magnetic support in this order,
   wherein the vertical squareness ratio is 0.70 to 1.00,
   the center line average roughness Ra measured regarding the surface of the magnetic layer with an atomic force microscope is equal to or smaller than 2.5 nm,
   an interface variation rate between the magnetic layer and the non-magnetic layer in a cross section image obtained by imaging with a scanning electron microscope (SEM) is equal to or less than 2.0%, and
   the interface variation rate between the magnetic layer and the non-magnetic layer is obtained as follows:
   providing a sample of the magnetic recording medium for cross section observation,
   capturing 10 SEM images in randomly selected portions of the sample at an acceleration voltage of 5 kV, an imaging magnification of 200,000, and at 960 pixel× 1280 pixel,
   specifying the interface between the magnetic layer and the non-magnetic layer and the interface between the non-magnetic layer and the non-magnetic support, based on the captured SEM images,
   obtaining the arithmetical mean T of the thickness of the non-magnetic layer based on the captured SEM images, and
   calculating the interface variation rate between the magnetic layer and the non-magnetic layer from the following formula:

Interface variation rate (%)=(σ/T)×100 where σ is the standard deviation of thickness of the non-magnetic layer obtained regarding the 10 SEM images, and T is the arithmetical mean of the thickness of the non-magnetic layer.

2. The magnetic recording medium according to claim 1, wherein the void volume of the non-magnetic layer in the cross section image obtained by imaging with a scanning electron microscope is equal to or less than 10.0%.

3. The magnetic recording medium according to claim 1, wherein the non-magnetic powder of the non-magnetic layer includes carbon black.

4. The magnetic recording medium according to claim 3, wherein the specific surface area of the carbon black included in the non-magnetic layer is 280 to 500 m$^2$/g.

5. The magnetic recording medium according to claim 3, wherein the non-magnetic layer includes 30.0% by mass or more of the carbon black with respect to the total amount of the non-magnetic powder.

6. The magnetic recording medium according to claim 1, wherein the thickness of the non-magnetic layer is equal to or less than 1.00 μm.

7. The magnetic recording medium according to claim 1, wherein the magnetic layer includes a non-magnetic powder.

8. The magnetic recording medium according to claim 7, wherein the non-magnetic powder of the magnetic layer includes colloidal particles.

9. The magnetic recording medium according to claim 8, wherein the colloidal particles are silica colloidal particles.

10. The magnetic recording medium according to claim 1, further comprising:
a back coating layer including a non-magnetic powder on a surface of the non-magnetic support opposite to a surface provided with the non-magnetic layer and the magnetic layer.

11. A magnetic recording and reproducing device comprising:
the magnetic recording medium according to claim 1; and
a magnetic head.

12. The magnetic recording and reproducing device according to claim 11,
wherein the void volume of the non-magnetic layer in the cross section image obtained by imaging with a scanning electron microscope is equal to or less than 10.0%.

13. The magnetic recording and reproducing device according to claim 11,
wherein the non-magnetic powder of the non-magnetic layer includes carbon black.

14. The magnetic recording and reproducing device according to claim 13,
wherein the specific surface area of the carbon black included in the non-magnetic layer is 280 to 500 m$^2$/g.

15. The magnetic recording and reproducing device according to claim 13,
wherein the non-magnetic layer includes 30.0% by mass or more of the carbon black with respect to the total amount of the non-magnetic powder.

16. The magnetic recording and reproducing device according to claim 11,
wherein the thickness of the non-magnetic layer is equal to or less than 1.00 μm.

17. The magnetic recording and reproducing device according to claim 11,
wherein the magnetic layer includes a non-magnetic powder.

18. The magnetic recording and reproducing device according to claim 17,
wherein the non-magnetic powder of the magnetic layer includes colloidal particles.

19. The magnetic recording and reproducing device according to claim 18,
wherein the colloidal particles are silica colloidal particles.

20. The magnetic recording and reproducing device according to claim 11,
wherein the magnetic recording medium comprises a back coating layer including a non-magnetic powder on a surface of the non-magnetic support opposite to a surface provided with the non-magnetic layer and the magnetic layer.

* * * * *